Jan. 30, 1962    C. GROS    3,018,997
TURBINE UNIT FOR TURBODRILLS AND TURBOCORERS
Filed May 20, 1957    2 Sheets-Sheet 1
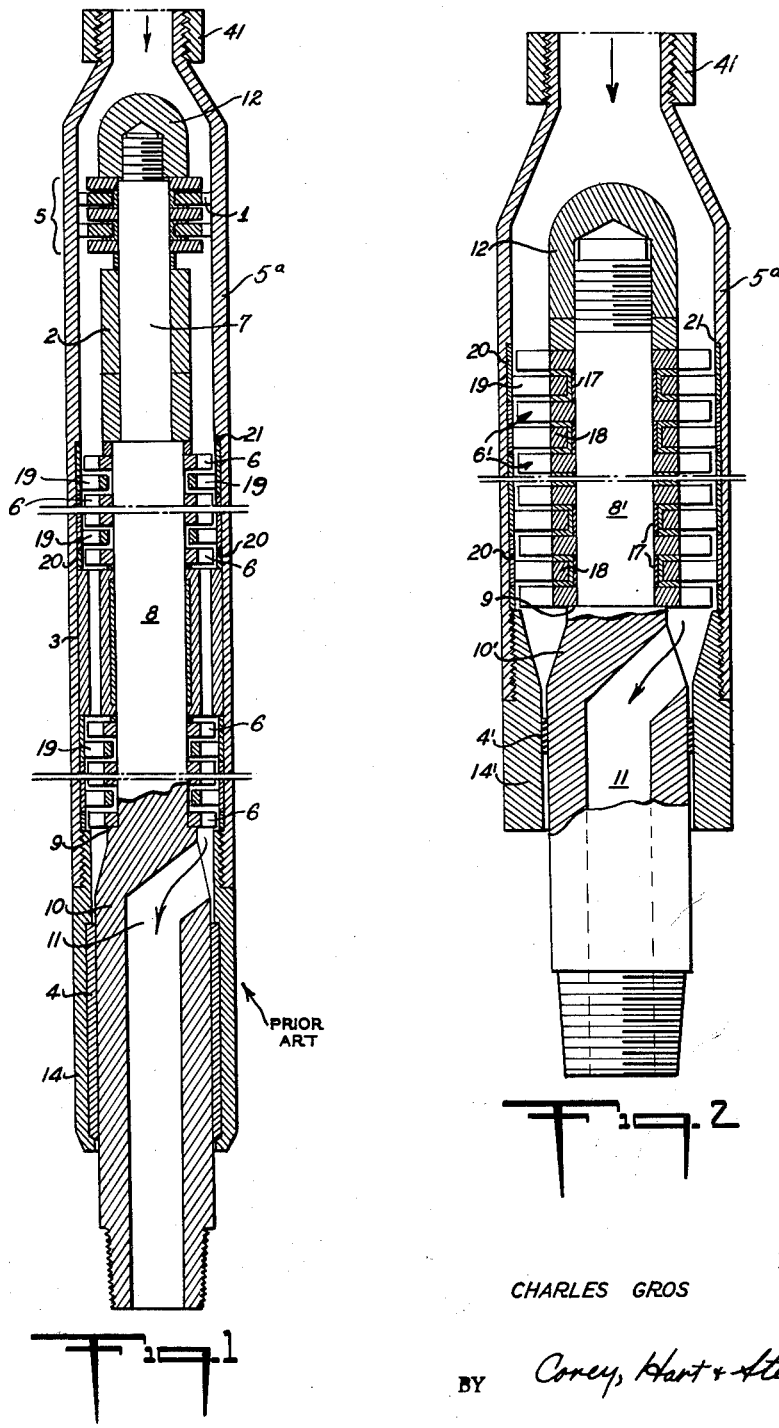
INVENTOR
CHARLES GROS
BY
ATTORNEYS Jan. 30, 1962  C. GROS  3,018,997
TURBINE UNIT FOR TURBODRILLS AND TURBOCORERS
Filed May 20, 1957  2 Sheets-Sheet 2
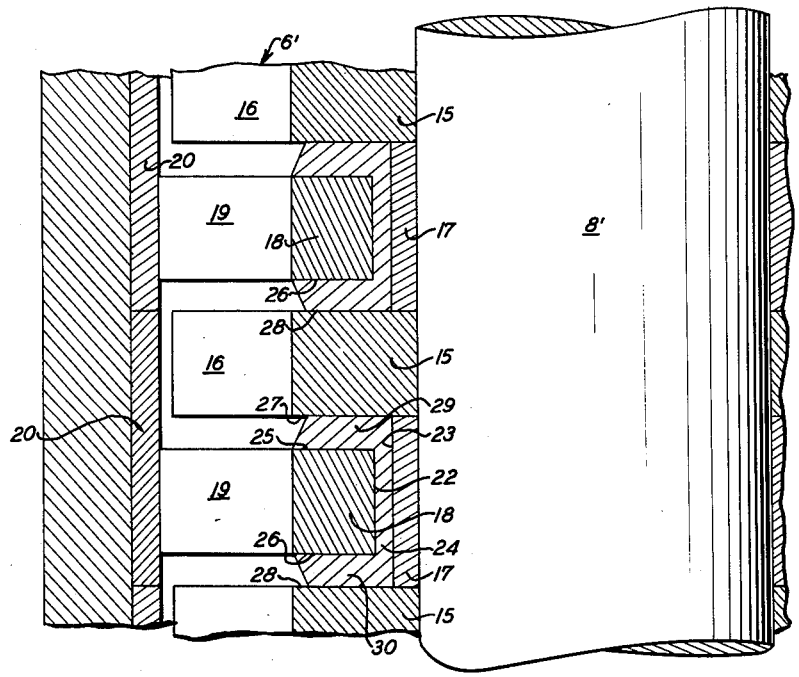
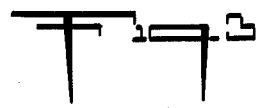
INVENTOR
CHARLES GROS
BY *Corey, Hart & Temple*
ATTORNEYS United States Patent Office 3,018,997
Patented Jan. 30, 1962

3,018,997
TURBINE UNIT FOR TURBODRILLS AND TURBOCORERS
Charles Gros, La Tronche, France, assignor to Etablissements Neyrpic, Grenoble, France, a corporation of France
Filed May 20, 1957, Ser. No. 660,405
Claims priority, application France May 28, 1956
4 Claims. (Cl. 253—3)

This invention relates to a turbine unit for driving rotary drilling and coring tools in well drilling.

In turbo drilling the rotary drill bit or corer, as the case may be, is driven by a hydraulic turbine supported at the lower end of a string of drill pipe and located in the immediate vicinity of the drilling tool. The turbine is driven by a fluid which is pumped downwardly from the top of the well through the drill string and which after passing through the turbine returns to the surface through the bore hole space outside of the drill string. The fluid utilized for this purpose is usually a drilling mud of relatively high specific gravity.

Drilling turbines as presently constructed include a cylindrical casing which is usually secured at its upper end to the lowermost section of pipe in the drill string and which supports the stator elements of the turbine. Disposed axially of the casing is a rotatable shaft which carries the rotor elements of the turbine. The shaft is supported and centered with respect to the casing to maintain the stator and rotor elements in proper coactive relation by one or more independent bearing units which may also be utilized to form a substantially fluid tight seal between the turbine casing and the shaft. The turbine also includes a thrust bearing unit that is independent of the coacting stator and rotor elements thereof. This bearing unit may be designed and embodied in the turbine to take care of longitudinal and transverse thrust of the shaft so that it supports the shaft properly at all times relative to the casing whatever the direction of forces ending to move it from such position and whether the forces exerted thereon by the fluid exactly compensate the thrust due to the drill bit or other cutting tool.

An object of the present invention is to provide an improved turbine structure which does not require independent thrust bearing units for supporting the driven member thereof, for absorbing the axial force exerted on such member, or for maintaining the axial alignment of such member with relation to the coaxial stationary member of the structure.

In carrying out the foregoing and other objects of the invention, the coacting rotor and stator elements of the turbine are so utilized that in addition to performing the normal turbine functions for which they were designed, they form part of and function in the nature of a multiple collar thrust bearing unit to support and center the shaft and to take care of the thrust thereof.

As is known, a multiple collar thrust bearing unit is usually composed of fixed rings and movable rings with a suitable bearing material interposed between adjacent fixed and movable rings. In the practice of the present invention, the rotor elements of the turbine constitute the movable parts of the thrust bearing unit formed by the turbine elements and the stator elements constitute the fixed parts of such unit. Located between the rotor and stator elements of the turbine and preferably fixed to one of them are bearing shoes formed of any suitable bearing material, such as for example, a bearing metal, a suitable synthetic rubber composition such as neoprene, or natural rubber compounded and vulcanized to a suitable degree of hardness and compressibility. With this construction each stator element of the turbine will function in the nature of a thrust block to oppose the axial thrust of the shaft through adjacent rotor elements and the resilient bearing material. By interposing the bearing material between the stator elements and longitudinally extending surfaces fixed with relation to the shaft, each stator element will additionally function to maintain the shaft properly centered. By constructing the turbine so that in its operations the thrust and transverse forces of the shaft are applied to each turbine element, it is possible to have as many bearing and thrust elements as there are turbine elements. The turbine elements may also be selectively utilized in any predetermined pattern as bearing and/or thrust elements depending upon the conditions under which the turbine is used in actual practice. For example, it may be determined beforehand that only one out of every three stator elements need be utilized as a bearing member to take care of the longitudinal and transverse stresses of the shaft in a particular operating situation.

There are a number of advantages which result from a turbine constructed as above indicated in accordance with the invention. One obvious advantage is the reduction in longitudinal volume of the turbine due to the elimination of the spaces formerly required for the independent bearing units. A further reduction in longitudinal volume is attained because the locking nuts for such units are also eliminated, it being now necessary to provide only two nuts to maintain the rotor and stator elements in attached relation. Thus, the longitudinal length of the turbine may be reduced so that actually it is not substantially longer than the sum of the heights of the rotor and stator elements in the turbine. Also since the independent bearing units and the parts required to properly incorporate them in the turbine structure are eliminated, the latter is substantially simplified. The remaining parts, which constitute a substantial reduction in the number and types of standard parts required in the turbine, may be manufactured more economically and may be more readily assembled and disassembled.

The details and advantages of the present invention will be more completely understood from the following description when read in conjunction with the accompanying drawings, in which:

FIG. 1 is a longitudinal vertical section of a drilling turbine of the prior art;

FIG. 2 is a similar view illustrating a drilling turbine constructed in accordance with the invention;

FIG. 3 is a vertical section of a portion of the turbine of FIG. 2 and showing in enlarged detail the construction and arrangement of the rotor and stator elements thereof; and Drilling turbines of the conventional type shown in FIG. 1 of the drawings are adapted to be attached to the lowermost pipe section 41 in the drill string and to receive the drilling mud therefrom as shown by the arrow in FIG. 1. The downwardly flowing mud passes through orifices 1 provided in the fixed elements of a multiple thrust bearing support 5 for the rotor shaft. The movable elements of the support 5 are locked in position on the upper end of the shaft section 7 by a nut 12. Below the support 5 the mud passes into the blade section of the turbine and drives the rotor blades to turn the shaft. The rotor elements 6 of the turbine are stacked on a rotor blade-carrying section 8 of the shaft in a plurality of stacks, two being shown by way of example. The lower stack of rotor elements 6 is supported by a shoulder 9 formed at the lower end of shaft section 8 adjacent the point where the shaft is increased in diameter to form the hollow shaft section 10. Positioned above such lower stack on shaft section 8 is a radial bearing 3 of suitable construction to insure proper lateral support for the shaft. The upper stack of rotor elements 6 is located on the shaft section 8 above the bearing 3. The two stacks of rotor elements and the intermediate bearing 3 are locked in position on shaft section 8 by a plurality of locking nuts 2 located on shaft section 7, the movable elements of the support 5 and the nut 12. After passing through the lower stack of rotor elements, the drilling mud is returned to the center of the shaft through a passageway 11 in shaft section 10. The mud flowing down through passageway 11 is discharged into the region of the tool and passes upwardly in the bore hole about the drilling string. A radial bearing 4 located on the shaft section 10 insures proper support and centering of the shaft in such region and provides a substantially fluid tight joint between the shaft section 10 and the nut 14 threadedly secured to the bottom end of the turbine casing.

FIG. 2 shows a generally similar turbine unit attached to the lowermost section 41 of the drill string and provided with rotors and stators constructed and arranged in accordance with the present invention to additionally function as bearings for the support and centering of the shaft and to take care of any longitudinal or transverse stresses which may be exerted on the shaft during the drilling operations. As a result of these additional functions of the turbine rotors and stators, it is possible to eliminate the multiple thrust bearing support 5 and the associated locking nuts 2, which were necessary in the turbine structure of FIG. 1, and consequently to eliminate the shaft section 7 on which such parts were mounted, thereby substantially reducing the length of the rotor shaft. In describing the construction of the turbine of FIG. 2 those parts which correspond to previously described parts in the turbine of FIG. 1 have been given the same reference characters.

In the turbine of FIG. 2 of the drawings, the drilling mud entering the turbine casing from the hollow drill stem passes directly into the bladed section of the turbine. The rotor elements 6' of the turbine are stacked on a rotor blade-carrying section 8' of the shaft, being supported thereon by the shoulder 9 formed between shaft sections 8' and 10'. Inasmuch as the turbine rotors and stators are constructed to function as bearings, as has been indicated, the necessity for a radial bearing, such as the bearing 3 of the turbine of FIG. 1, is eliminated and the rotors may be mounted as a single, continuous stack on the shaft section 8'. In view of the elimination of radial bearing 3, shaft section 8' can be made substantially shorter than shaft section 8 and just long enough to take care of the height of the stack of rotor elements 6' and the locking nut 12.

Following its passage through the turbine blade section, the drilling mud passes through passageway 11 in shaft section 10' and discharges into the bore hole in the region of the tool being driven by the turbine. A further advantage of providing the individual turbine elements with bearing surfaces such as shown in the embodiment of FIG. 2, is that it is unnecessary to provide a radial support bearing 4 (note FIG. 1) between the shaft section 10' and the nut 14' connected to the lower end of the turbine casing. The elimination of a support bearing at this region, eliminates the necessity of prohibiting any leakage of the mud between shaft section 10' and the nut 14'. However, if desired, a relatively small seal bearing 4' of synthetic rubber or the like may be provided at this place. Here again a desirable shortening of the shaft section 10' is brought about.

As will be seen more clearly in FIG. 3 of the drawings, the rotor elements 6' in the turbine of FIG. 2, each include a cylindrically-shaped base portion 15 which is secured to the shaft section 8' in any suitable fashion, as by keys and key ways. Each of the base portions 15 is provided with a plurality of outwardly projecting turbine blades 16 having a height similar to the height of their associated base portion and a radial length only slightly less than the width of the space between such base portion and the base portions 20 of the stator elements. In this embodiment, the length of the rotor vaning is uniform. The rotor elements are maintained in properly spaced relation on shaft section 8' by cylindrically-shaped spacing rings 17. The thickness of the spacing rings 17 is substantially less than the thickness of the base portions 15 so that adjacent base portions spaced by a ring 17 form with the latter an annular groove for receiving an inner cylindrically-shaped or annular portion 18 of an associated stator element. The portion 18 of each stator element is integral with the outer ends of and supported by a plurality of blades 19 which project radially inwardly from the cylindrically-shaped base section 20 of such element. The stator blades 19 have a uniform length slightly greater than the blades of the adjacent rotor elements. The stator base sections 20 each have a height substantially equal to the sum of the heights of the upstream associated rotor element and the spacing ring 17 forming the inner wall of the groove into which such stator element projects. The stators are constructed and arranged so that the series of blades thereof alternate in interfingered relation with the series of blades of the rotor units. The stator base sections 20 are maintained in fixed relation relative to the casing 5a by the nut 14' and a shoulder 21 formed in the inner wall of the casing at the top of the stack of stator elements (note FIG. 2).

It will be observed in FIG. 3 of the drawings that the dimension of the annular stator portion 18 in a radial direction is such that the inner annular surface 22 thereof is spaced from the opposed outer annular surface 23 of its associated spacing ring 17. The space between such surfaces is filled with a suitable bearing material forming a bearing shoe 24 therebetween. Thus, each stator portion 18 forms with its associated ring 17 and bearing shoe 24, a combined thrust and radial bearing serving to rotatably support and center the shaft 81. The assembly of such parts will act as a multiple journal bearing and performs the bearing functions of the independent bearing units now employed in known turbine structures. As has been previously indicated the bearing shoe 24 may be constituted of any suitable material such as rubber or neoprene. The bearing shoe 24 is shown attached to the stator portion 18 in FIG. 3, but it will be understood that it may be secured instead to the ring 17 to equal advantage.

The dimension of a stator portion 18 in an axial direction is such that the annular surfaces 25, 26 thereof disposed at right angles to the longitudinal axis of the turbine are spaced from the opposed annular surfaces 27, 28 of the adjacent rotor base portions 15 between which the stator portion is located. The spaces between surfaces 25, 27 and between surfaces 26, 28 are filled by bearing shoes 29 and 30, respectively, constituted of a material preferably similar to bearing material used in forming bearing shoes 24. Preferably also the shoes 24, 29 and 30 are integrated to from a unitary U-shaped shoe which is mounted on the stator portion 18 between the bearing surfaces 27, 28, the stator portion 18 being inserted into the annular groove of such unitary shoe so that its exterior surfaces are enclosed by the shoe. It will be understood that the walls 29, 30 of this unitary shoe form with the stator portion 18 and the adjacent rotor portions 15 a thrust bearing in the nature of a multiple-color thrust bearing and that the assembly of such parts forms a thrust bearing having a height equal to the bladed section of the turbine. In operation, the stator surfaces 25 will coact with the rotor surfaces 27 and the shoe walls 29 to take care of downward thrusts of the shaft, while the stator surfaces 26 will coact with the rotor surfaces 28 and the shoe walls 30 to take care of upward thrusts of the shaft. The inherent resiliency of the material of the shoe walls 29 and 30 will return the shaft to its proper, predetermnied position when the forces causing a thrust are discontinued and balanced.

The rotor rings 15 are preferably made of a steel that is capable of being hardened by cementation or by nitriding so that the bearing surfaces 27 and 28 may give increased wear resistance by such treatment.

While I have hereinabove described and illustrated in the accompanying drawings several examples of my invention, it will be apparent that further changes may be made therein. It will also be apparent that the invention can be utilized to equal advantage with both coring and drilling turbines, and with turbines in which the rotor elements are mounted on the turbine casing and the stator elements are mounted on the shaft, as shown in my copending application Serial No. 659,635 filed May 16, 1957, now U.S. Patent No. 2,944,792, corresponding to French Application No. P.V. 3827, filed May 28, 1956. Hence, I wish it to be understood that I do not intend to limit myself by the disclosed embodiments, but intent to include all embodiments that may come within the scope of the appended claims.

The term "turbine element" as used in the above specification and in the claims is intended to be generic to the rotor and stator elements of the turbine, each of which elements comprises an annular set of radial blades and an annular ring that is concentric to such set of blades and provides the annular bearing surfaces.

I claim:

1. A hydraulic turbine having a casing member, a member disposed within said casing member, said members being disposed on a common axis and one of said members being rotatable on said axis relative to the other, a series of unitary turbine elements carried by each of said members, means removably connecting each of said series of elements to its associated member, each of the elements in both said series being composed of an annular set of radial blades and an annular ring concentric to and within said set of blades, said connecting means including means connecting each of said elements to its associated member so as to prevent axial movement of the blades thereof relative to said associated member, and said annular rings of the turbine elements in each of said series being arranged in stacked relation and in alternate separable arrangement with said annular rings of the turbine elements of the other of said series, the annular rings of the turbine elements connected to said inner member being spaced apart along said axis a distance greater than the dimension along said axis of the annular rings of the turbine elements connected to said casing member, and the inner peripheries of the annular rings of the turbine elements connected to said casing member being spaced radially outwardly from the inner peripheries of the annular rings of the turbine elements connected to said inner member, bearing material between the spaced annular rings of said alternately arranged elements so that the annular rings of the turbine elements in both said series are disposed in thrust bearing relation to each other to provide multiple axial support for said rotatable member, bearing material between the inner peripheries of the annular rings of the turbine elements connected to said casing member and said inner member so that such elements provide multiple radial support for said rotatable member, driven means connected to said rotatable member, and means for supporting the other of said members for receiving therefrom the thrust transmitted to said other member through said sets of annular rings of said series of turbine elements.

2. A hydraulic turbine having a casing member, a member disposed within said casing member, said members being disposed on a common axis and one of said members being rotatable on said axis relative to the other, a series of unitary turbine elements carried by each of said members, means removably connecting each of said series of elements to its associated member, each of the elements in both said series being composed of an annular set of radial blades and an annular ring concentric to and within said set of blades, said connecting means including means connecting each of said elements to its associated member so as to prevent axial movement of the blades thereof relative to said associated member, and said annular rings of the turbine elements in each of said series being arranged in stacked relation and in alternate separable arrangement with said annular rings of the turbine elements of the other of said series, a plurality of axially spaced means removable relative to said inner member for maintaining the annular rings of the turbine elements connected to said inner member spaced apart along said axis a distance greater than the dimension along said axis of the annular rings of the turbine elements connected to said casing member so that the annular rings of said alternately arranged elements are axially spaced from one another, bearing material between the spaced annular rings of said alternately arranged elements so that the annular rings of the turbine elements in both said series are disposed in thrust bearing relation to each other to provide multiple axial support for said rotatable member, the inner peripheries of the annular rings of the turbine elements connected to said casing member opposing and being spaced from the outer surfaces of said axially spaced means, bearing material between said inner peripheries and said opposed outer surfaces so that the same are in bearing relation to each other to provide multiple radial support for said rotatable member, driven means connected to said rotatable member, and means for supporting the other of said members for receiving therefrom the thrust transmitted to said other member through said sets of annular rings of said series of turbine elements.

3. A hydraulic turbine having a casing member, a member disposed within said casing member, said members being disposed on a common axis and one of said members being rotatable on said axis relative to the other, a series of unitary turbine elements carried by each of said members, means removably connecting each of said series of elements to its associated member, each of the elements in both said series being composed of an annular set of radial blades and an annular ring concentric to and within said set of blades, said connecting means including means connecting each of said elements to its associated member so as to prevent axial movement of the blades thereof relative to said associated member, and said annular rings of the turbine elements in each of said series being arranged in stacked relation and in alternate separable arrangement with said annular rings of the turbine elements of the other of said series, a plurality of axially spaced spacing rings removably mounted on said inner member for maintaining the annular rings of the turbine elements connected to said inner member spaced apart along said axis a distance greater than the dimension along said axis of the annular rings of the turbine elements connected to said casing member, a plurality of spacing rings removably mounted on said casing member for maintaining the annular rings of the turbine elements connected to said casing member in spaced relation to the annular rings of the other series of turbine elements alternately arranged therewith, the inner peripheries of the annular rings of the turbine elements connected to said casing members opposing and being spaced from the outer surfaces of said spacing rings on said inner member, a plurality of axially spaced unitary bearing shoes removable relative to said members and located in the spaces between adjacent of the annular rings of the turbine elements connected to said inner member and enclosing the annular rings of the other series of turbine elements located in said spaces, said bearing shoes bringing the annular rings of the turbine elements in both said series into thrust bearing relation to each other so as to provide multiple axial support for said rotatable member, and bringing the annular rings of the turbine elements connected to said casing member into bearing relation with said spacing rings on said inner member so as to provide multiple radial support for said rotatable member, driven means connected to said rotatable member, and means for supporting the other of said members for receiving therefrom the thrust transmitted to said other member through said sets of annular rings of said series of turbine elements.

4. A hydraulic turbine as defined in claim 1, in which said bearing material is in the form of a plurality of axially spaced, annular bearing shoes, each of said bearing shoes being formed of the bearing material between the annular rings of adjacent turbine elements connected to said inner member and the annular ring of the turbine element connected to said casing member and located between said adjacent turbine elements, and of the bearing material between the inner periphery of such annular ring of the turbine element connected to said casing member and said inner member, and each of said annular bearing shoes being coaxial with said common axis and of U section with the legs of the U disposed between said annular rings of said adjacent turbine elements and said annular ring of the turbine element located therebetween, and with the portion of the U connecting these legs disposed between the inner periphery of the annular ring of said turbine element located therebetween and said inner member.

References Cited in the file of this patent

UNITED STATES PATENTS

| | | |
|---|---|---|
| 905,858 | Elliot | Dec. 8, 1909 |
| 1,348,815 | Lewis | Aug. 3, 1920 |
| 2,113,213 | Leonard | Apr. 5, 1938 |
| 2,167,019 | Yost | July 25, 1939 |
| 2,348,047 | Yost | May 2, 1944 |
| 2,591,488 | Yost | Apr. 1, 1952 |
| 2,592,519 | Postlewaite | Apr. 8, 1952 |

FOREIGN PATENTS

| | | |
|---|---|---|
| 1,669 | Great Britain | Jan. 27, 1905 |
| 122,425 | Switzerland | Jan. 2, 1928 |
| 143,021 | Austria | Oct. 10, 1935 |
| 560,836 | Germany | Oct. 7, 1932 |

OTHER REFERENCES

"What's Happening to Turbodrill Development?" by W. R. Postlewaite, pages 156–160 of World Oil, October, 1955, Drilling Section.